(12) United States Patent
Barrick et al.

(10) Patent No.: US 8,645,670 B2
(45) Date of Patent: Feb. 4, 2014

(54) SPECIALIZED STORE QUEUE AND BUFFER DESIGN FOR SILENT STORE IMPLEMENTATION

(75) Inventors: Brian D. Barrick, Pflugerville, TX (US); Chung-Lung K. Shum, Wappingers Falls, NY (US); Aaron Tsai, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 924 days.

(21) Appl. No.: 12/031,998

(22) Filed: Feb. 15, 2008

(65) Prior Publication Data

US 2009/0210655 A1    Aug. 20, 2009

(51) Int. Cl.
| G06F 7/38 | (2006.01) |
| G06F 9/00 | (2006.01) |
| G06F 9/44 | (2006.01) |
| G06F 13/00 | (2006.01) |
| G06F 13/28 | (2006.01) |

(52) U.S. Cl.
USPC .......................................... 712/225; 711/133

(58) Field of Classification Search
USPC ................................................ 712/225, 226
See application file for complete search history.

(56) References Cited

U.S. PATENT DOCUMENTS

| 6,141,747 | A | * | 10/2000 | Witt .............................. 712/225 |
| 6,970,997 | B2 | | 11/2005 | Shibayama et al. |
| 7,062,638 | B2 | | 6/2006 | Yoaz et al. |
| 7,120,762 | B2 | | 10/2006 | Rajwar et al. |
| 7,571,286 | B2 | * | 8/2009 | Fontenot et al. ............. 711/133 |

OTHER PUBLICATIONS

Subramaniam, et al. "Fire-and-Forget: Load/Store Scheduling with No Store Queue at All". The 39th Annual IEEE/ACM International Symposium on Microarchitecture (MICRO'06). 12 Pages.
Fahs, et al. "Continuous Optimization" Proceedings. 32nd International Symposium on Computer Architecture, Madison, WI, USA, Jun. 4-8, 2005.
Lepak, et al. "Silent Stores for Free". Microarchitecture, 2000. MICRO-33. Proceedings. 33rd Annual IEEE/ACM International Symposium. 2000. pp. 22-31.
Lepak, et al. "Temporally Silent Stores" vol. 30 , Issue 5 (Dec. 2002). Special Issue: Proceedings of the 10th annual conference on Architectural Support for Programming Languages and Operating Systems. pp. 30-41.
Lepak, et al. "On the Value Locality of Store Instructions". Computer Architecture, 2000. Proceedings of the 27th International Symposium. pp. 182-191.
z/Architecture. "Principles of Operation". Sixth Edition (Apr. 2007). IBM. 1218 pages.

* cited by examiner

*Primary Examiner* — Andrew Caldwell
*Assistant Examiner* — William B Partridge
(74) *Attorney, Agent, or Firm* — Cantor Colburn LLP; John Campbell

(57) ABSTRACT

A processor including an architecture for limiting store operations includes: a data input and a cache input as inputs to data merge logic; a merge buffer for providing an output to an old data buffer, holding a copy of a memory location and two way communication with a new data buffer; compare logic for receiving old data from the old data buffer and new data from the new data buffer and comparing if the old data matches the new data, and if there is a match determining an existence of a silent store; and store data control logic for limiting store operations while the silent store exists. A method and a computer program product are provided.

7 Claims, 3 Drawing Sheets

SPECIALIZED STORE QUEUE AND BUFFER DESIGN FOR SILENT STORE IMPLEMENTATION

BACKGROUND OF THE INVENTION

This invention relates to the field of computer processor storage access, and more particularly, to reducing unnecessary accesses to the cache hierarchy.

A common performance problem found in modern microprocessors involves time spent accessing data storage. One approach to minimizing this problem is to reduce or eliminate any unnecessary accesses to storage. A common unnecessary access involves store operations which are just writing the same value back to the given memory location (silent store). There are some existing approaches to detecting and preventing store operations which are considered silent (not changing anything). These approaches involve some form of read prior to executing the store. The problems associated with this is that it either requires additional reads (just before storing) or requires a read of the cache data early and executing the store right away (before receiving additional store operations to the given memory location). There exists cases where initial read of old data must occur much earlier than the data associate with the given store. Also for these cases, there may be numerous actions to be taken on the given memory location before the given data to write is known.

Thus, what are needed are apparatus and methods for, providing a copy of a given memory location created from a read of the data cache at address generation time (initial issue), updating the copy with appropriate updates as the cache data is updated, and using this side copy to detect silent stores.

BRIEF SUMMARY OF THE INVENTION

An exemplary embodiment includes a processor including an architecture for limiting store operations includes: a data input and a cache input as inputs to data merge logic; a merge buffer for providing an output to an old data buffer, holding a copy of a memory location and two way communication with a new data buffer; compare logic for receiving old data from the old data buffer and new data from the new data buffer and comparing if the old data matches the new data, and if there is a match determining an existence of a silent store; and store data control logic for limiting store operations while the silent store exists.

Also disclosed is a method for storing data with a processor includes: receiving a store data instruction; requesting store data; comparing incoming store data to old data; and storing the store data if the store data does not match the old data.

Further, included is a computer program product stored on machine executable media and including machine executable instructions for storing data using a processor, includes instructions for: receiving a store data instruction; requesting store data; comparing incoming store data to old data; and storing the store data if the store data does not match the old data.

BRIEF DESCRIPTION OF THE DRAWINGS

Referring now to the drawings wherein like elements are numbered alike in the several figures, wherein.

DETAILED DESCRIPTION OF EXEMPLARY EMBODIMENTS

Figure 1:
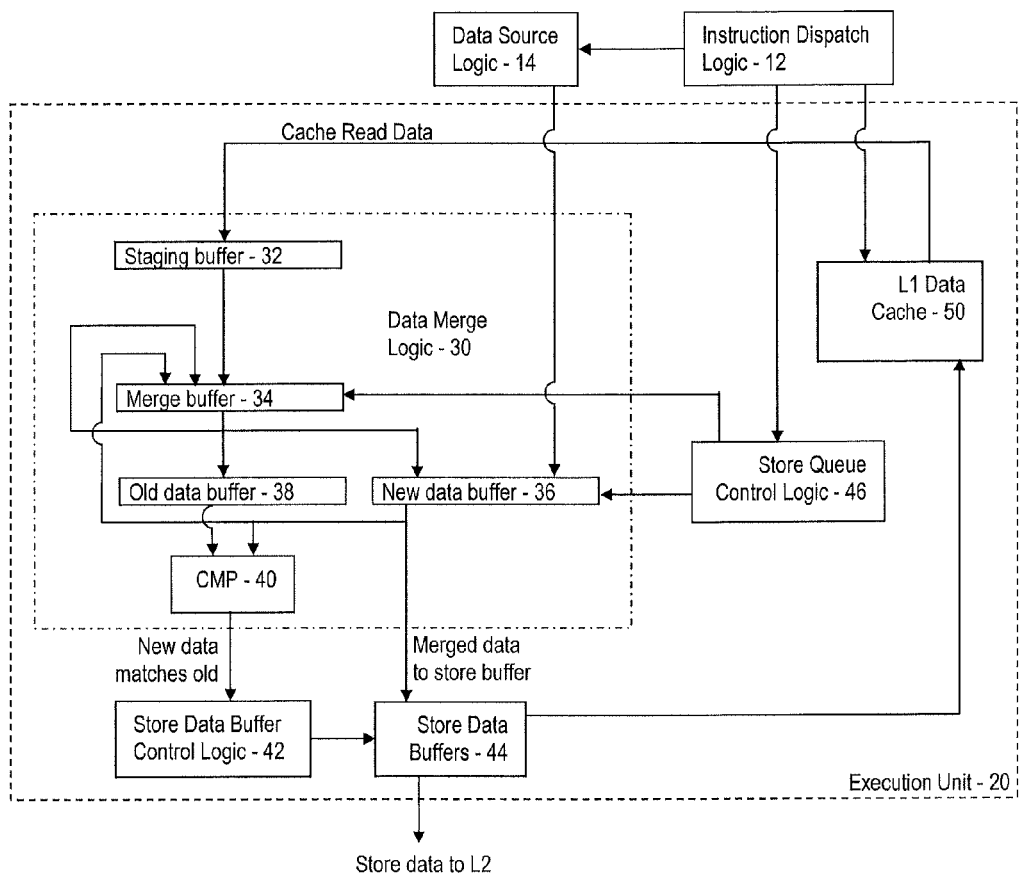
FIG. 1 is a block diagram showing aspects of a silent store buffering scheme which allows for updates to storage to occur after reading the cache and prior to detecting whether the store is modified.

Turning now to the drawings in greater detail, FIG. 1 provides an exemplary embodiment of an architecture 100 of a processor (or microprocessor) for practicing the teachings herein. In the architecture 100, there is an execution unit 20, an instruction dispatch unit (IDU) 12 and a data source logic 14. IDU 12 is logic configured to send instructions out for store address generation (referred to herein as "store agen") and store data. In addition, there is a data source logic 14 which could be a fixed-point/floating point unit or could even be a cache reader. The data source logic 14 receives requests from the IDU 12 to provide a data beat (up to 8 bytes) for a given store operation. The execution unit 20 includes a level of the cache hierarchy as well as a store queue which can modify that cache. The Execution Unit 20 further to includes Data Merge Logic 30, Store Data Buffer Control Logic 42, Store Data Buffers 44, Store Queue Control Logic 46, and an L1 data cache 50. The Data Merge Logic 30 further includes a cache data staging buffer 32, a set of merge buffers 34, a latch to hold the final store data 36, a latch to hold the pre-merged data 38 and a compare block to determine if the data has changed 40.

In this example, the store queue control logic 46 accepts store address requests while at the same time the L1 data cache 50 will read the current contents at the requested address. The L1 data cache 50 will provide the data results over to the data merge logic 30, initially to the cache data staging buffer 32. The store queue control logic 46 will provide control to the data merge logic 30 as to where to hold the data within the merge buffer 34. The store queue control logic will keep track of the data held in the merge buffer 34 and what address ranges were read out of the L1 data cache 50 for those merge results. Whenever the data portion of the store operation is ready, the Instruction dispatch logic 12 will indicate to the data source logic 14 to send the data. The data source logic 14 will indicate to the store queue control logic that data is coming. The store queue control logic will indicate to the data merge logic 30 which merge buffer 34 will contain the existing data for the given location. The store queue control logic will also indicate to the new data buffer logic 36 which bytes should be updated with the incoming data. For the indicated bytes, the new data will be used and for the remaining bytes, the data will come from the merge buffer 34. The old data buffer 38 will capture all the bytes coming from the merge buffer 34. The old data and new data get latched up and then driven to the compare logic 40. If the data from the old data latch 38 and the new data latch 36 are the same, the store is determined to be silent. This silent store detection is then passed down to the store data buffer control logic 42 while at the same time the updated store data is passed to the store data buffer 44. If the store data buffer control logic 42 was informed that a silent store was passed down, the store data buffer control logic 42 will indicate back to the store queue control logic 46 that the store has completed without actually writing the store data out. Once the store address queue 46 has been informed the data operation is complete, the store can be considered completed.

For cases where there are multiple overlapping stores to the same memory space, the store queue control logic 46 will detect that an incoming data operation overlaps with more than just the current store operation, the data merge logic will be instructed to write the contents of the new data buffer (36) into the younger store merge buffer entry 34. When the younger store operation is requested, the merge buffer entry 34 will not only contain the value read out of the cache at address request time, but the update from the older data operation as well. For cases where the younger store address operation comes in after the older data operation, the store queue control logic will detect this condition and indicate to the data merge logic 30 to read out the data from the merge buffer 34 used by the older store operation and write this into the younger store op merge buffer location.

Figure 2:
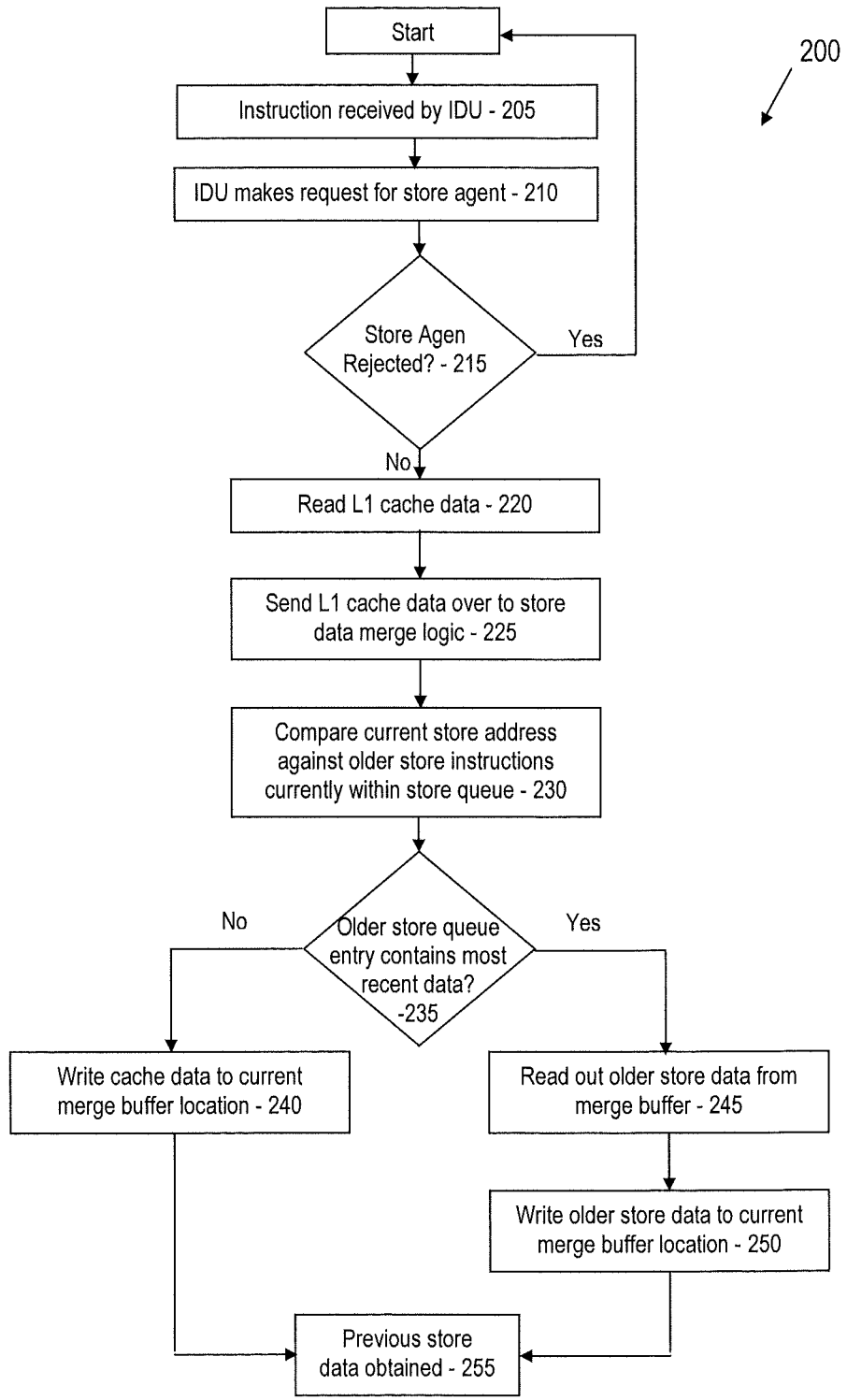
FIG. 2 is an exemplary flow diagram depicting an embodiment where merge buffers associated with silent store detection are updated with cache data or already received store data which hits the same addressable location.

Referring now to FIG. 2 of the drawings, the reference numeral 200 generally designates a flow diagram showing an exemplary embodiment of how the store merge buffers are originally written. The process begins at step 205, wherein an instruction is received. This step can be performed by, for example Instruction dispatch logic of FIG. 1. This step can also include decoding the received instruction, identifying the appropriate execution unit to execute the instruction, and passing the received instruction to the identified execution unit. This step can also identify dual-issue instructions which are passed on to multiple execution units. At next step 210, a request is made for a store address generation (agen) checking performed by, for example Store Queue Control Logic 46 of FIG. 1. At next decisional step 215, a determination is made as to whether the store queue is able to accept and read out the cache data located at the memory location specified by the request. If not, this can be rejected back to the IDU. If accepted, the L1 data cache will read out the data and present it to the data merge logic.

At next step 220, the L1 data cache is read and the data is sent over to the data merge logic 30 of FIG. 1. At decision point 235, the store queue control logic will check to see if an older active store operation has updated the given memory location. If this has occurred, the store queue logic 46 of FIG. 1 will indicate that the older store queue merge buffer should be read and that data stored into the current request merge buffer 34 of FIG. 1, instead of the read data from the L1 cache 50.

Figure 3:
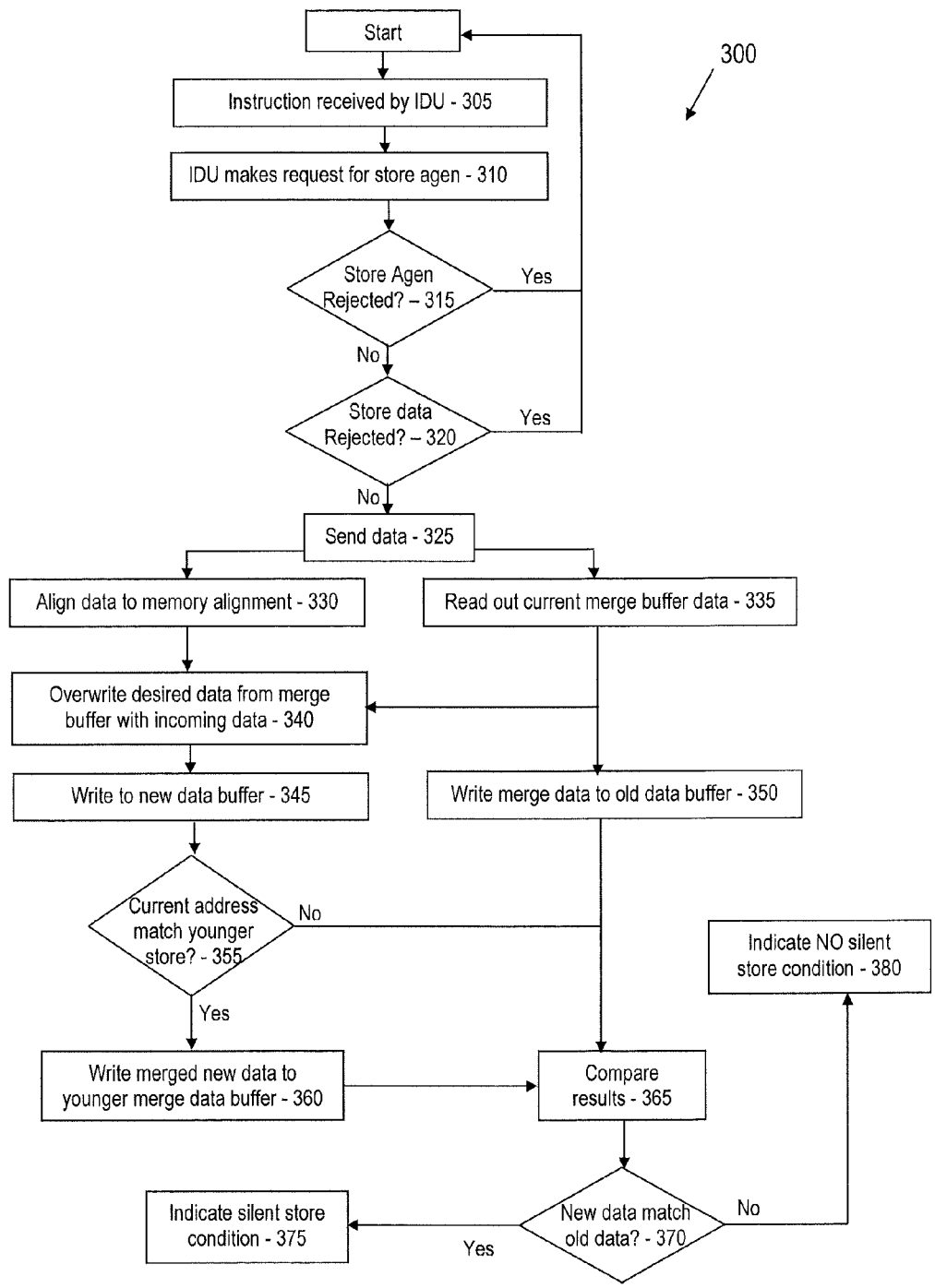
FIG. 3 is a flow diagram depicting an embodiment of how incoming store data updates merge buffers and identifies whether its own data is silent.

Referring to FIG. 3 of the drawings, the reference numeral 300 generally designates another exemplary flow diagram showing an embodiment of how the store merge buffers are originally written. The process begins at step 305, wherein an instruction is received. This step can be performed by, for example Instruction dispatch logic of FIG. 1. This step can also include decoding the received instruction, identifying the appropriate execution unit to execute the instruction, and passing the received instruction to the identified execution unit. This step can also identify dual-issue instructions which are passed on to multiple execution units. At next step 310, a request is made for store data to be presented. At decision point 315, the request is rejected if the store agen is rejected as in decision point 215 of FIG. 2. If the address portion does not reject, we go onto the next decision point. The next step is decision point 320 where we check to see if there exists a problem with sending the data such as a register dependency or a load miss. If the instruction gets past the decision point 320, we proceed to next step.

The next step 325, we begin sending data over to the data merge logic 30 of FIG. 1. At step 330, the incoming data is aligned to line up based on memory address. This aligned data is then sent to step 340 to merge in with existing data. At step 335, the existing merge buffer contents are read out and sent to step 340 to represent the initial data state. At step 340, the initial data from the merge buffer is merged with the aligned data to generate the new data to write to the new data buffer as in 36 of FIG. 1. The initial data value from step 335 is also itself written into the old data buffer at step 350. Once the initial data value is written into the old data buffer (step 350) and the new/merged data has been written into the new data buffer (step 345), we proceed to the next step 355.

At the decision point 355, checking to see if a younger store is operating on the same memory location is performed. If so, the results from step 340 are written to the younger store merge buffer as well in step 360. A determination is made if there is a younger store which has accessed the same memory location. If decision point 355 is yes, the new data is written into the younger data buffer location 34 of FIG. 1. Independent of the result of decision point 355, we move on to step 365.

At the next step 365, we have written the old and new data buffers (38 and 36 of FIG. 1) and compare the 2 buffers. If both the old data and new data are the same, an indication of silent store will be sent on to the store data buffer control logic 42 of FIG. 1. If the old data and new data are not the same, there is no silent store indication sent to the store data buffer control logic 42. At the same time the compare 365 is being performed, the data from the new data buffer are being sent to the store data buffer 44 in FIG. 1.

The store data buffer control logic 42 of FIG. 1 will write the store data to memory if no silent store indication is made. If a silent store indication is made, the store to memory is blocked. Once any required store data is written to memory, the store data buffer control logic 42 of FIG. 1 will indicate to the store queue logic 46 of FIG. 1 that has completed and any required store associated with this store operation has now been written into the L1 data cache 50 of FIG. 1 as well as lower levels of cache hierarchy.

Technical effects and benefits include a store queue/buffer design point which allows for detection of silent stores. This design point allows for reads of cache elements to occur many cycles before new data arrives and also allows for overlapping store operations to the same memory locations to occur and still correctly detect where silent stores are occurring.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a generalpurpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A system for limiting store operation, the system comprising a processor having a merge unit, the system configured to perform a method comprising:
    providing, by a merge data buffer, an output to an old data buffer to hold a copy of a memory location and to provide two way communication with a new data buffer;
    receiving old data from the old data buffer and new data from the new data buffer;
    comparing the old data to the new data, to determine an existence of a silent store based on the new data matching the old data;
    storing, by a store data buffer, the new data from the new data buffer into memory absent the silent store, the store data buffer connected to the new data buffer on the processor, the store data buffer being distinct from the old data buffer and the new data buffer;
    blocking store operations from the store data buffer to a data cache, the store data buffer being connected to the data cache on the processor.

2. The system as in claim 1, wherein the merge buffer and a data input provide data to the new data buffer.

3. The system as in claim 1, further comprising store queue control logic for at least one of accepting store address requests and tracking data within data merge logic.

4. The system as in claim 1, wherein the merge buffer is adapted for merging the old data with the new data.

5. The system as in claim 1, wherein the method further comprises based on detection of the silent store being passed to store data control logic, indicating completion of a store operation to store queue control logic without writing the merged data to an L1 cache.

6. A method for storing data with a processor, the method comprising:
    providing by a merge data buffer, an output to an old data buffer to hold a copy of a memory location and to provide two way communication with a new data buffer;
    receiving old data from the old data buffer and new data from the new data buffer;
    comparing the old data to the new data, to determine an existence of a silent store based on the new data matching the old data;
    storing, by a store data buffer, the new data from the new data buffer into memory absent the silent store, the store data buffer connected to the new data buffer on the processor, the store data buffer being distinct from the old data buffer and the new data buffer;
    blocking store operations from the store data buffer to a data cache, the store data buffer being connected to the data cache on the processor.

7. A computer program product stored on a non-transitory computer readable storage medium and comprising machine executable instructions for storing data using a processor, the product comprising instructions for:
    providing, by a merge data buffer, an output to an old data buffer to hold a copy of a memory location and to provide two way communication with a new data buffer;
    receiving old data from the old data buffer and new data from the new data buffer;
    comparing the old data to the new data, to determine an existence of a silent store based on the new data matching the old data;
    storing, by a store data buffer, the new data from the new data buffer into memory absent the silent store, the store data buffer connected to the new data buffer on the processor, the store data buffer being distinct from the old data buffer and the new data buffer;
    blocking store operations from the store data buffer to a data cache, the store data buffer being connected to the data cache on the processor.

* * * * *